United States Patent [19]

Francis et al.

[11] Patent Number: 5,239,013
[45] Date of Patent: Aug. 24, 1993

[54] NONLINEAR OPTICALLY ACTIVE POLYMERS

[75] Inventors: Cecil V. Francis, Woodbury; Steven M. Heilmann, Afton; Larry R. Krepski, White Bear Lake; Jerald K. Rasmussen, Stillwater, all of Minn.

[73] Assignee: Minnesota Mining and Manufacturing Company, St. Paul, Minn.

[21] Appl. No.: 953,211

[22] Filed: Sep. 29, 1992

Related U.S. Application Data

[60] Continuation of Ser. No. 523,609, May 11, 1990, abandoned, which is a division of Ser. No. 341,720, Apr. 21, 1989, Pat. No. 4,952,640.

[51] Int. Cl.$^5$ .............................. C08F 8/30; C08F 8/32; C08F 8/34
[52] U.S. Cl. .................................. 525/328.2; 525/279; 525/326.8; 525/328.4
[58] Field of Search .................. 525/279, 326.8, 328.2, 525/328.4

[56] References Cited

U.S. PATENT DOCUMENTS

| | | | |
|---|---|---|---|
| 4,369,232 | 1/1983 | Scopazzi | 525/328.2 |
| 4,451,619 | 5/1984 | Heilmann et al. | 525/326.8 |
| 4,694,048 | 9/1987 | Choe | 525/376 |
| 4,694,066 | 9/1987 | DeMartino | 528/373 |
| 4,695,608 | 9/1987 | Engler et al. | 525/279 |
| 4,720,355 | 1/1988 | DeMartino | 252/582 |
| 4,737,560 | 4/1988 | Heilmann et al. | 526/260 |
| 4,808,332 | 2/1989 | DeMartino et al. | 526/312 |
| 4,822,682 | 4/1989 | Dorsch et al. | 428/411.1 |
| 4,828,758 | 5/1989 | Gillberg-LaForce et al. | 524/439 |
| 5,013,795 | 5/1991 | Coleman et al. | 525/297 |
| 5,075,352 | 12/1991 | Elmasry | 525/279 |
| 5,157,108 | 10/1992 | Krepski et al. | 525/326.8 |

FOREIGN PATENT DOCUMENTS 0294706 12/1980 European Pat. Off. .
0218938 4/1987 European Pat. Off. .
0271251 11/1987 European Pat. Off. .

OTHER PUBLICATIONS

Encyclopedia of Polymer Science and Engineering, vol. 11, New York, Wiley & Sons, 1988, pp. 558–571.
Journal of Coatings Technology, vol. 55, 1983, pp. 55–61.

Primary Examiner—Paul R. Michl
Assistant Examiner—Peter Szekely
Attorney, Agent, or Firm—Gary L. Griswold; Walter N. Kirn; Lorraine R. Sherman

[57] ABSTRACT

Organic groups covalently bound to a polymer backbone provide second or third order nonlinear susceptibilities to the polymer. In another aspect, a method is disclosed for providing the novel polymers of the invention. Polymers of the invention can be directionally oriented to provide useful optically nonlinear media for use in nonlinear optical devices such as optical switches or light modulation devices.

10 Claims, No Drawings

NONLINEAR OPTICALLY ACTIVE POLYMERS

This is a continuation of application Ser. No. 07/523,609 filed May 11, 1990 now abandoned, which is a division of USSN 07/341,720, filed Apr. 21, 1989, now U.S. Pat. No. 4,952,640.

FIELD OF THE INVENTION

This invention relates to organic polymers in which organic moieties having second or third order nonlinear susceptibilities are covalently bound to the polymer backbone. In another aspect, a method is disclosed for providing the novel polymers of the invention. In a further aspect, novel compositions of matter comprising the polymers of the invention are disclosed. Polymers of the invention can be directionally oriented to provide useful optically nonlinear media for use in nonlinear optical devices.

BACKGROUND OF THE INVENTION

Laser techniques have been developed which make it convenient to obtain various fundamental frequencies of coherent laser light by utilizing solid, gas, and liquid media. Outstanding characteristics of these solid-state lasers include being small, inexpensive, and requiring no maintenance; their output, however, is limited to the near-infrared region of the spectrum and is of low power. In many applications, laser light having frequencies above those conveniently obtainable is required. Nonlinear optical crystals have, therefore, frequently been employed to convert coherent light of a fundamental frequency into light with a frequency twice the fundamental frequency. This conversion is termed "second harmonic generation" (SHG).

The possibility of using organic molecules in SHG and other nonlinear optical devices has generated much interest recently. Certain substituted aromatic molecules are known to exhibit large optical nonlinearities. Application potential of organic materials in nonlinear optical devices is greater than that of conventional inorganic electrooptic materials because of bandwidth limitations of the latter materials.

European Patent Application EP 0 218 938 A2 discloses polymeric nonlinear optical materials and devices. Optically nonlinear media are obtained by incorporating an optically nonlinear organic guest molecule (NLO molecule) in an appropriate polymeric host matrix, followed by poling to provide a directional orientation of the guest molecule in the polymeric host. Disclosed hosts are glassy polymers including polyacrylates, polymethacrylates, clear epoxies, polystyrene, and polycarbonates. A disadvantage of this approach is that the guest NLO molecule displays only limited solubility, generally less than about 20% by weight, in the host polymer, thus limiting the magnitude of the nonlinear optical response achievable.

U.S. Pat. No. 4,720,355 discloses poly(N,N-dialkylacrylamides) as host polymers. These polymeric host materials are better solvents for the guest NLO molecules, thus providing more homogeneous mixtures and allowing higher loadings of the NLO guest. However, it is desirable to be able to incorporate even higher loadings of NLO molecules into polymeric materials for the preparation of optically nonlinear media.

An additional disadvantage of the host-guest approach is that a small NLO molecule is relatively free to rotate and diffuse within the polymeric host. In some instances diffusion of the guest out of the host polymer may occur.

U.S. Pat. No. 4,694,066 discloses thermotropic liquid crystalline polymers having a comb structure of mesogenic side chains wherein the mesogens also exhibit second order nonlinear susceptibility. These polymers, in which the NLO molecule is covalently bound as a side chain to the polymer backbone, are obtained by the steps of: 1) synthesizing a mesogenic NLO molecule, 2) preparing a derivative of that molecule which contains a polymerizable group, and 3) polymerizing the resultant NLO monomer from step 2 to produce the desired polymer. A disadvantage of this approach is that preparation of the NLO monomer generally involves a multi-step, difficult, and expensive synthetic sequence. An additional and even more serious disadvantage of this approach is that many contemplated NLO monomers have functional groups which would be incompatible with the desired polymerization reaction. For example, many of the donor and acceptor groups which lead to large nonlinear optical susceptibilities can function as chain transfer agents (thus interfering with polymerization) or as retarders or inhibitors of free radical polymerizations.

U.S. Pat. No. 4,694,048 teaches reaction of a cyclic anhydride-containing polymer with an aromatic hydrazine. The product is then cyclodehydrated to produce a thermoplastic polymer containing recurring cyclic hydrazide groups, the polymer being useful as a nonlinear optical substrate. A disadvantage of the teachings in U.S. Pat. No. 4,694,048, however, is limited availability of anhydride-containing polymers or copolymers and also the generally low molecular weights of those polymers which are available.

Once an optically nonlinear medium has been obtained by a poling process, rotational and/or diffusional motion may have detrimental effects upon the directional orientation of the NLO molecule. This can lead to a decay in, and eventually to a disappearance of, the nonlinear optical response of the medium.

SUMMARY OF THE INVENTION

It is desirable to provide nonlinear optical media in which rotational and diffusional motions of molecules responsible for NLO activity are restricted.

Briefly, the present invention provides organic polymeric materials in which organic groups characterized as having second or third order nonlinear susceptibilities are covalently bound pendant to the polymer backbone. Importantly, the invention also provides a simple and convenient method for immobilizing (covalently binding) these NLO organic groups to a polymeric matrix. More importantly, the method of the invention provides stable polymeric materials which can be directionally oriented (poled) to provide useful optically nonlinear media for use in NLO devices.

The polymers of the invention are useful as nonlinear optical components in optical light switches and light modulator devices.

In this application:

"alkyl" and "alkylene" mean the monovalent and divalent residues remaining after removal of one or two hydrogen atoms, respectively, from a linear, cyclic, or branched chain hydrocarbon having 1 to 20 carbon atoms;

"lower alkyl" and "lower alk-" means C-1 to C-4 alkyl;

"aryl" and "arylene" mean the monovalent and divalent residues remaining after removal of one or two hydrogen atoms, respectively, from an aromatic compound (single ring and multi- and fused-cyclic rings) having 5 to 12 ring atoms and includes substituted aromatics such as lower alkaryl and aralkyl and those substituted with lower alkoxy, N,N-di(lower alkyl)amino, nitro, cyano, and/or lower alkyl carboxylic ester groups, "external field" means an electric, magnetic or mechanical stress field which is applied to a substrate of mobile organic molecules, to induce dipolar alignment of the molecules parallel to the field; and "optically transparent" means transparent or light transmitting with respect to incident fundamental light frequencies and harmonic light frequencies. In a laser frequency converter, a present invention nonlinear optical lens polymer is transparent to both the incident and exit light frequencies; and "second order" means any optical or electro-optical process which is dependent on the square of the electric fields. This includes second harmonic generation wherein the frequency of light is doubled, three wave mixing, Pockels effect, and the like;

"third order" means an optical or electrooptical process which is dependent on the cube of the electric field; this includes third harmonic generation where the frequency of light is tripled or the wavelength is one-third, four wave mixing, Kerr effect, and the like;

"backbone" of a polymer means in the main chain and not a terminal or pendent group; and "pendant" means not in the main chain but appended to it.

The present invention provides a novel process for preparation of polymeric nonlinear optical media. The process involves first preparing a polymer containing reactive functional groups and then reacting the resulting polymer with an NLO molecule having a complementary reactive group. This method overcomes disadvantages of prior art methods. Organic molecules offer certain advantages for use in nonlinear optics applications compared to inorganic crystals which are commonly used in the art. Properties of organic materials are more readily varied to optimize mechanical and thermo-oxidative stability and laser damage threshold. Additional advantages, especially in terms of processing and fabrication ease, can be envisioned when such organic materials are in polymeric form.

DETAILED DESCRIPTION OF THE INVENTION

The present invention provides a class of polymers having general Formula I:

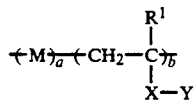

wherein
M is a polymer unit derived from one or more free radically polymerizable, ethylenically unsaturated monomers by polymerization with an ethylenically-unsaturated reactive monomer,
$R^1$ is hydrogen or methyl;
X is a linking group selected from the group consisting of

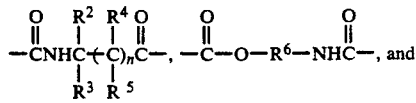

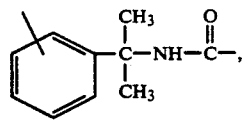

in which $R^2$, $R^3$, $R^4$, and $R^5$ are independently hydrogen, or an alkyl or aryl group, and $R^6$ is an alkylene group; and n is an integer 0 or 1;

Y is a group remaining after removal of a hydrogen atom from an NLO molecule HY; and a and b are independently integers; a can be zero and b is at least 1, sufficient to provide the polymer with a weight percent of M units of between 0 and 99.

In one embodiment, the present invention provides a polymer comprising recurring monomeric units of formula I, as disclosed above, which can exhibit a second order nonlinear electro-optic susceptibility $\chi^{(2)}$ of at least $1\times 10^{-6}$ esu as measured at 1.06 μm excitation wavelength, and wherein the pendant X-Y group comprises at least about 10 weight percent of the polymer, and the polymer has a glass transition temperature of at least 40° C.

In another embodiment of the present invention there is provided a polymer of formula I, as disclosed above, which can exhibit a third order nonlinear optical susceptibility $\chi^{(3)}$ of at least $1\times 10^{-12}$ esu as measured at 1.91 μm excitation wavelength, and wherein the pendant X-Y group comprises at least about 10 weight percent of the polymer, and the polymer has a glass transition temperature of at least 40 ° C.

The overall set of reactions to provide the novel polymer of the invention can be depicted as follows:

ethylenically unsaturated monomer + reactive monomer (such as 2-alkenyl azlactone or isocyanatoalkyl ester of unsaturated carboxylic acid) having a general formula

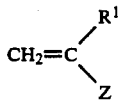

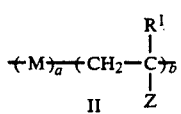

reactive polymer

+HY
(NLO molecule)

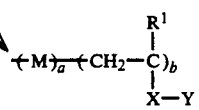

I
novel polymer

More particularly, novel polymers of Formula I, which preferably have a number average molecular weight in the range of 2,000 to 5,000,000, preferably 5,000 to 200,000, and more preferably 15,000 to 50,000, are conveniently prepared by the reaction of a NLO molecule HY with a reactive polymer of general Formula II:

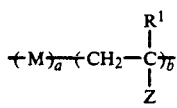

wherein
Z is an organic group which contains a functional group reactive with the NLO molecule HY; and
M, $R^1$, a, and b are as previously described. Preferred Z groups contain azlactone and isocyanate groups.

Reactive polymers of Formula II are well-known in the art or may be prepared by procedures well-known in the art. These polymers are prepared in general by free radical copolymerization of one or more free radically polymerizable, ethylenically unsaturated monomers with one or more reactive monomers using polymerization procedures common in the art.

Suitable ethylenically unsaturated monomers useful for providing the "M" copolymer unit in the preparation of reactive polymers of Formula II include essentially any free radically addition polymerizable monomer. An excellent discussion of such monomers is contained in C. E. Schildknecht's text "Vinyl and Related Polymers", Wiley, N.Y., 1959. Examples include: vinyl aromatic monomers such as styrene, α-methylstyrene, and 2- and 4-vinylpyridine; α,β-unsaturated carboxylic acids such as acrylic acid, methacrylic acid, itaconic acid, maleic acid, fumaric acid, and crotonic acid; α,β-unsaturated carboxylic acid derivatives such as methyl methacrylate, butyl methacrylate, 2-ethylhexyl methacrylate, ethyl acrylate, butyl acrylate, isooctyl acrylate, octadecyl acrylate, cyclohexyl acrylate, tetrahydrofurfuryl acrylate, phenyl acrylate, phenethyl acrylate, benzyl acrylate, cyanoethyl acrylate, diethyl itaconate, acrylamide, acrylonitrile, N,N-dimethylacrylamide, and N-butylacrylamide; vinyl esters of carboxylic acids such as vinyl acetate, and vinyl 2-ethylhexanoate; vinyl halides such as vinyl chloride and vinylidene chloride; vinyl ethers such as methyl vinyl ether, 2-ethylhexyl vinyl ether, and butyl vinyl ether; olefins such as ethylene; N-vinyl compounds such as N- vinylpyrrolidone and N-vinylcarbazole; vinyl ketones such as methyl vinyl ketone; and vinyl aldehydes such as acrolein and methacrolein. Preferred monomers for the purposes of the present invention are the α,β-unsaturated carboxylic acid derivatives.

As is apparent to one skilled in the art, the above monomers can be utilized with reactive monomers alone or, as is often desirable, combinations of the above monomers can be utilized.

Useful reactive monomers for purposes of the present invention include ethylenically unsaturated monomers having functional groups reactive with NLO molecules. Preferred reactive monomers include 2-alkenyl azlactones and free radically polymerizable monomers having azlactone and isocyanate functional groups, such as isocyanatoalkyl esters of unsaturated carboxylic acids.

2-Alkenyl azlactone reactive monomers have the general Formula IV:

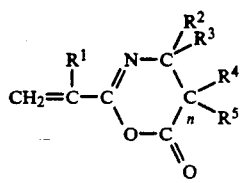

wherein
$R^1$, $R^2$, $R^3$, $R^4$, $R^5$, and n are as previously described.
Useful azlactone monomers are described in U.S. Pat. No. 4,378,411 and in "Polyazlactones", Encyclopedia of Polymer Science and Engineering, Vol. 11, Second Edition, Wiley, N.Y., 1988, pp 558–571, both of which are herein incorporated by reference, and include:
2-vinyl-4,4-dimethyl 2-oxazolin-5-one, also called
2-vinyl-4,4 dimethylazlactone (VDM),
2-isopropenyl-4,4-dimethyl-2-oxazolin-5-one,
2-vinyl-4,4-diethyl-2-oxazolin-5-one,
2-vinyl-4-ethyl-4-methyl-2-oxazolin-5-one,
2-vinyl-4-dodecyl-4-methyl-2-oxazolin-5-one,
2-vinyl-4,4 pentamethylene-2-oxazolin-5-one,
2-vinyl-4-methyl-4-phenyl-2-oxazolin-5-one,
2isopropenyl-4-benzyl-4-methyl-2-oxazolin-5-one, and
2-vinyl-4,4-dimethyl-1,3-oxazin-6-one.

Preferred azlactone monomers are
2-vinyl-4,4-dimethyl-2-oxazolin-5-one,
2-isopropenyl-4,4-dimethyl-2-oxazolin-5-one, and
2-vinyl-4,4-dimethyl-1,3-oxazin-6-one.

Useful isocyanatoalkyl esters of unsaturated carboxylic acids have general Formula V:

wherein $R^1$ and $R^6$ are as previously described. Preferred monomers of Formula IV are 2-isocyanatoethyl acrylate and 2-isocyanatoethyl methacrylate.

Other useful isocyanate-functional monomers are m- or p-isopropenylcumyl isocyanate (available from American Cyanamid, Stanford, Conn.) having the structural formula:

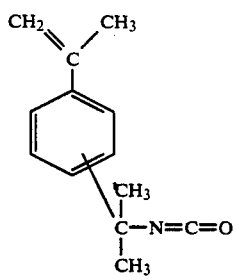

Preparation of azlactone-containing reactive polymers of Formula II are described, for example in K. Huebner, et al., *Angew. Makromol. Chem.*, 1970, 11, 109, and in U.S. Pat. No. 4,378,411. Copolymerization of isocyanatoethyl methacrylate has been described, for example, in H. G. Fravel Jr. and P. E. Cranley, *Adhesives Age*, Oct. 1984, pp. 18-20, and in M. R. Thomas, *J. Coatings Tech.*, 1983, 55, 55-61. Fairly standard free radical polymerization conditions are utilized to produce reactive polymers II except that solvents such as alcoholic solvents that could react with the reactive monomers are to be avoided. Useful organic solvents include ethyl acetate, toluene, xylene, acetone, methyl ethyl ketone, acetonitrile, and tetrahydrofuran, and combinations of two or more of these solvents.

Free radical initiators for the polymerization reaction include any initiator known in the art that is useful in polymerizing ethylenically unsaturated compounds. Particularly useful initiators include azobisisobutyronitrile, benzoyl peroxide, t-butyl hydroperoxide, and the like, in an amount of 0.01 to 5.0 weight percent, preferably 0.1 to 1.0 weight percent based on monomers.

Temperatures in the polymerization process are usually mild and are those necessary to effect decomposition of the initiator and subsequent copolymerization of the reactive monomer and the ethylenically unsaturated comonomer. Generally temperatures from room temperature to about 100° C. are useful. A temperature range of 50° C. to 80° C. is preferred.

Preparation of novel polymers of Formula I involves reaction of reactive polymers of Formula II with an NLO molecule, HY. As should be obvious to one skilled in the art, the hydrogen atom of HY is an "active" hydrogen atom (i.e., for the purposes of this invention, it is attached to a functional group on the NLO molecule which is capable of undergoing a chemical reaction with the reactive groups of polymer II). Specific examples of functional groups containing "active" hydrogen atoms include amines, alcohols, thiols, carboxylic acids, and carboxamides. Whereas all of these functional groups will react with isocyanates, only amines, alcohols, and thiols are useful for the reaction with azlactones. Amines and alcohols are the preferred functional groups for preparation of the novel polymers of the invention.

Reaction of the NLO molecule and the reactive polymer of Formula II can be conducted under conditions conventional for reaction of azlactone or isocyanate functional polymers with active hydrogen containing molecules. Reaction of azlactone polymers with amine, alcohol, or thiol functional NLO molecules can be conducted according to the teachings of U.S. Pat. No. 4,378,411. Reaction with the azlactone polymer is conveniently accomplished by addition of the NLO molecule directly to a solution of the polymer. No additional ingredients are required for primary amine functional NLO molecules, although protonic acids may be utilized to accelerate the reaction.

Catalysts are generally required for reaction with alcohol or thiol functional NLO molecules. With alcohols, either Bronsted or Lewis acids or tertiary amine bases may be utilized as catalysts; tertiary amine bases are preferred, with bicyclic amidine bases such as diazabicycloundecene (DBU) and diazabicyclononene (DBN) being most preferred. These two catalysts are commercially available. Tertiary amine bases are effective catalysts are commercially with thiol functional NLO molecules.

When the reactive polymer of Formula II is isocyanate functional, reaction with the NLO molecule is generally conducted in the presence of a small amount of a conventional catalyst for promoting isocyanate reactions. Again, no catalyst is necessary when the NLO molecule is amine functional. However, acidic or basic catalysts may be advantageously utilized for accelerating reactions with other "active" hydrogen containing NLO molecules. Basic catalysts, for example tertiary amines, are useful when the NLO molecule is thiol or aromatic hydroxy functional, while Lewis acids (in particular tin compounds such as dibutyltin dilaurate, for example) are excellent catalysts for the reaction with alcohol functional NLO compounds.

A discussion of nonlinear optical properties is presented in U.S. Pat. No. 4,810,338, particularly cols. 9 and 10, which patent is incorporated herein by reference.

NLO molecules HY which are useful in the present invention are organic molecules which exhibit a large macroscopic second or third order nonlinear susceptibility, $\chi^{(2)}$ and $\chi^{(3)}$, respectively. In general, these compounds are conjugated molecules substituted with both electron donor and electron acceptor groups. Optical nonlinearities are enhanced when an NLO molecule has electron donor and acceptor groups bonded at opposite ends of the conjugated system of the molecule. Many classes of these compounds are known in the art, as discussed, for example, in H. E. Katz, et al., *J. Am. Chem. Soc.*, 1987, 109, 6561-6563, and references therein.

For additional useful NLO molecules see, for example, D.S. Chemla and J. Zyss, "Nonlinear Optical Properties of Organic Molecules and Crystals" volume 2, Academic Press, 1987, pp. 221-267.

Preferably, for the purposes of this invention, the NLO molecules are those which exhibit a molecular second order nonlinear hyperpolarizability, $\beta$, of at least about $1 \times 10^{-29}$ electrostatic units (esu). $\beta$ is defined as the molecular hyperpolarizability which means expansion coefficient for a second order term in the expansion of the molecular dipole moment. In addition, as discussed above, the NLO molecules must possess an "active" hydrogen containing functional group which is capable of reacting with reactive polymer II. Active hydrogen containing NLO molecules are available commercially or are readily prepared according to literature procedures or modifications of literature procedures. In general, these useful NLO molecules are not novel in and of themselves.

Examples of classes of useful donor-acceptor NLO molecules include substituted benzenes, biphenyls, stilbenes, azo dyes, and Schiff's bases. Representative molecules are: p-nitroaniline, 4-amino-4'-nitrostilbene, 4-amino-4'-azastilbene-N-oxide, 4-aminopyridine-N- oxide, 4-amino-4'-nitrobiphenyl, 4-amino-4'-nitrofluorene, 4-amino-4'-cyanobiphenyl, and Disperse Red 1.

Using the process of the present invention, substantially higher amounts of NLO molecules may be incorporated into a polymer matrix than previously was possible. Amounts as high as 85 percent or higher can be incorporated due to the fact that the NLO molecules become covalently bound to the polymer backbone. As is obvious to one skilled in the art, the weight percent of NLO molecules incorporated is dependent upon the relative molecular weights of the NLO molecule and the reactive monomer unit and can vary from more than zero up to about 90 weight percent.

If the molecules of the polymer are in a random configuration, the medium can exhibit a third harmonic generation (THG). When this third order generation is required, preferred molecules are those that exhibit a third order molecule hyperpolarizability, $\gamma$(gamma), of at least $1 \times 10^{-35}$ esu. $\gamma$ is defined as the cubic term in the expansion of molecular dipole moment.

Poling of the polymers of the present invention can be accomplished by any means known in the art. For example, the polymer solution can be first coated onto a glass substrate between poling electrodes. Preferably, the poling electrodes were vapor deposited onto the glass support prior to spin coating the polymer. The polymer was then heated above the glass transition temperature; an electric field in the range $10^4$–$10^7$ v/cm was applied and then the electrodes and coated support were cooled to room temperature whereupon the electric field was removed. The resulting poled polymer emitted second harmonic frequency when exposed to laser input at a wavelength of 1.58 $\mu$m; the light at the second harmonic frequency was detected at a wavelength of 0.79 $\mu$m using a monochromator and a photomultiplier tube. Additional discussion relating to poling can be found in col. 16 of U.S. Pat. No. 4,810,338 which patent is incorporated herein by reference.

A nonlinear optical component or device of the invention, which can be an optical switch or light modulation device, can comprise the polymer of the invention as the component or as a coating on a substrate. The nonlinear optical component can be in the form of a noncentrosymmetric configuration or aligned polymer molecules and the component or device can exhibit a $\chi^{(2)}$ of at least $1 \times 10^{-6}$ esu. A noncentrosymmetric alignment of molecules can be induced with an external field. When the polymer molecules are in a random configuration, the component can exhibit third harmonic response.

More specifically, a second or third harmonic generator comprises a laser source of coherent light radiation at a fixed fundamental frequency, an organic polymer according to the present invention, a means for poling the polymer, a means for directing the output radiation of the laser onto the poled polymer to provide output radiation of a second or third harmonic frequency, and output means for utilizing the resultant second or third harmonic frequency. Poling means have been discussed above; means for directing output radiation of the laser can be a prism or diffraction grating as is known in the art; and output means can be a prism or diffraction grating, optionally coupled with a filtering device, as is also known in the art.

Additionally, a process for converting a fixed fundamental frequency of coherent laser light into a second or third harmonic frequency comprises the steps of: providing a polymer of the present invention, poling said polymer, passing laser light through said poled polymer to provide output radiation of a second or third harmonic frequency, the polymer being transparent to the fixed fundamental frequency and to the second or third harmonic frequency.

Devices that are capable of generating coherent second or third harmonic light radiation are well known in the art. Representative examples of such devices are described in U.S. Pat. Nos. 3,395,329; 3,431,484; and 3,858,124, all of which are incorporated herein by reference for the purpose of describing devices which can incorporate the NLO optically active materials of the prsent invention, and which also exhibit second or third harmonic generation.

Objects and advantages of this invention are further illustrated by the following examples, but the particular materials and amounts thereof recited in these examples, as well as other conditions and details, should not be construed to unduly limit this invention.

PREPARATION OF REACTIVE POLYMERS

1. Preparation of poly(2-vinyl-4,4-dimethylazlactone)

A reaction vessel was charged with 2-vinyl-4,4-dimethylazlactone (from SNPE, Inc., Princeton, N.J., 200 g, 1.44 mole), ethyl acetate (467 g), and 2,2,-azobis-2-methylpropionitrile (AIBN, 1.0g). The mixture was purged for 10 minutes by bubbling a stream of nitrogen gas through the solution, then the mixture was heated at 60° C. for 24 hrs. to effect polymerization. Analysis of the polymer solution by a standard gravimetric procedure verified 100% conversion of monomer to polymer.

2. Preparation of azlactone-containing copolymers as reactive polymers

By a procedure similar to that described in PREPARATION 1 above, various copolymers of 2-vinyl-4,4-dimethylazlactone (VDM) and methyl methacrylate (MMA) were prepared. A wide variety of additional copolymers can also be prepared, such as those described in U.S. Patent No. 4,378,411.

3. Preparation of poly(isocyanatoethyl methacrylate).

Isocyanatoethyl methacrylate (IEM, available from Dow Chemical Co., Midland, Mich., 6.3 g, 0.04 mole) was dissolved in dry toluene (200 mL) under nitrogen. The solution was warmed to 60° C. and then AIBN (0.067 g) was added. After stirring at 60° C. for 18 hrs, a clear viscous solution resulted from which fibers could be drawn, indicating the polymeric nature of the reaction product.

4. Preparation of isocyanate-containing copolymers.

Copolymers containing isocyanate functional reactive groups can be prepared by procedures similar to Preparation 2 by substituting IEM or p- or m-isopropenylcumyl isocyanates for VDM.

EXAMPLE 1

A poly(IEM) solution (50 mL), prepared as in PREPARATION 3 above, was diluted with dry toluene to 200 mL. A toluene solution of 4-amino-4,-nitrobiphenyl (2.2 g, 10 mmole) was slowly added to the polymer solution and stirred at 60° C. for 2 hrs before the resulting adduct polymer was precipitated into either ether or methanol. Infrared analysis confirmed urea link formation and disappearance of the isocyanate functionality.

EXAMPLE 2

A poly(IEM) solution (14 mL) was diluted with dry toluene and dimethylformamide (DMF) to 200 mL. A toluene solution of 4-amino-4-cyanobiphenyl (1.6 g, 8 mmole) was slowly added to the polymer solution and stirred at 50° C. for 20 hrs before the resulting polymer was precipitated into ether, water, or methanol. Infrared analysis confirmed formation of the desired adduct polymer

EXAMPLE 3

A poly(IEM) solution (7 mL, 4 mequiv) was diluted with 50 mL dry DMF under a nitrogen atmosphere, then warmed to 55° C. To this solution, in a 40 minute period a solution of the Schiff's base derived from 4-(6-hydroxyhexyloxy)benzaldehyde and 4-methoxyaniline (1.53 g, 4 mmole) (prepared by procedures well known in the art) in 30 mL dry DMF was added dropwise. The resulting solution was stirred at 55° C. for 22 hrs before the desired adduct polymer was precipitated into water and filtered. Infrared spectroscopy confirmed the structure of the polymer.

EXAMPLE 4

The poly(VDM) solution described in PREPARATION 1 above was diluted to 15% solids with ethyl acetate. To 1.23 g of this solution was added a solution of 4-amino-4'-nitrobiphenyl (0.284 g, 1.33 mmole) in 4 mL of 1:1 (vol/vol) ethyl acetate/DMF. Two drops of trifluoroacetic acid as catalyst were added and the mixture was heated at 55° C. for 21.5 hours. Infrared analysis of the solution verified formation of the adduct polymer.

EXAMPLE 5

To a 15% solids solution of poly(VDM) in ethyl acetate (0.6258 g of solution, 0.675 mequiv) was added N-(2-hydroxyethyl)-4-aminobenzonitrile (0.1073 g, 0.662 mmole), DMF (0.5 g) and diazabicycloundecene (DBU, 1 drop). After allowing the mixture to stand at room temperature overnight, infrared analysis showed complete conversion to the adduct polymer.

EXAMPLE 6

A solution of Disperse Red 1 (Aldrich Chemical Co., Milwaukee, Wis., 0.31 g, 1 mmole) in DMF (2.22 g) was added to a 30% solids solution of poly(VDM) in methyl ethyl ketone (0.46 g of solution, 1 mequiv). To this dark red solution was added DBU (0.01 g). The solution was heated at 65° C. for 2.5 days. Infrared analysis indicated complete reaction. The resulting polymer contained 70 percent, on a weight basis of the NLO molecule.

The above-described resulting polymer was spin coated onto a glass support between two chromium electrodes which had been vapor deposited previously on the glass support. The coated support was heated to 90° C., then an electric field of $5 \times 10^4$ volts/cm was applied. The coated support and electrodes were cooled to 23° C. and the electric field was removed. The resulting poled polymer exhibited a $\chi^{(2)}$ of $5 \times 10^{-9}$ esu. The polymer coated support containing the electrodes was useful as a component in an electro optic modulator.

EXAMPLE 7

Example 6 was repeated by substituting poly(MMA-co-VDM) (50:50 mole/mole, 36.5% solids in ethyl acetate) (0.65 g solution, 1 mequiv of azlactone) for the poly(VDM). The Disperse Red 1 was dissolved in DMF (2.69 g) and the resultant mixture heated at 65° C. for 2 days to effect conversion to the desired adduct polymer.

EXAMPLE 8

Poly(MMA-co-VDM) (90:10 mole/mole, 34.4% solids in ethyl acetate) (0.91 g solution, 0.3 mequiv azlactone) was reacted with Disperse Red 1 (0.09 g, 0.3 mmole) dissolved in DMF (1.69 g) in the presence of DBU (0.01 g) at 65° C. for 2 days to provide the corresponding adduct polymer.

Various modifications and alterations of this invention will become apparent to those skilled in the art without departing from the scope and spirit of this invention, and it should be understood that this invention is not to be unduly limited to the illustrative embodiments set forth herein.

We claim:

1. An organic polymer comprising organic groups having second or third order nonlinear susceptibilities, said groups being covalently bound pendant to the polymer backbone, said polymer having units of the formula:

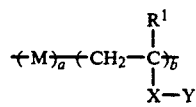

wherein
M is a polymer unit derived from one or more free radically polymerizable, ethylenically-unsaturated monomers by polymerization with a reactive monomer;
$R^1$ is hydrogen or methyl;
X is a linking group

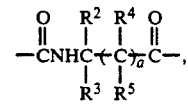

in which $R^2$, $R^3$, $R^4$, and $R^5$ are independently hydrogen, alkyl, or aryl; and n is an integer 0 or 1;
Y is a group remaining after removal of a hydrogen atom from nonlinear optically active molecule HY; and
a and b are independently integers, wherein a can be zero and b is at least 1, sufficient to provide the polymer with a weight percent of M units of between 0 and 99.

2. The polymer according to claim 1 wherein said ethylenically unsaturated monomer from which M is derived is selected from the group consisting of vinyl aromatic monomers, α,β-unsaturated carboxylic acids and their derivatives, vinyl esters of carboxylic acids, vinyl halides, vinyl ethers, olefins, N-vinyl compounds, vinyl ketones and vinyl aldehydes.

3. The polymer according to claim 1 wherein Y is derived from a compound having an active hydrogen atom and is selected from the group consisting of amines, alcohols, thiols, carboxylic acids, and carboxamides having a molecular second order nonlinear hyperpolarizability, β, of at least $1 \times 10^{-29}$ esu, or a molecular third order nonlinear hyperpolarizability, γ, of at least $1 \times 10^{-35}$ esu.

4. The polymer according to claim 3 wherein X is derived from the group consisting of 2-alkenyl azlactones.

5. The polymer according to claim 4 wherein said 2-alkenyl azlactones have the formula

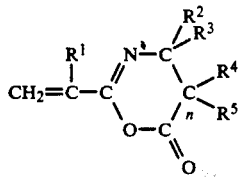

wherein
$R^1, R^2, R^3, R^4, R^5$ and n are as previously described.

6. The polymer according to claim 5, wherein said 2-alkenyl azlactone is selected from the group consisting of 2-vinyl-4,4-dimethyl-2-oxazolin-5-one, also called 2-vinyl-4,4-dimethylazlactone (VDM), 2-isopropenyl-4,4-dimethyl-2-oxazolin-5-one, 2-vinyl-4,4-diethyl-2-oxazolin-5-one, 2-vinyl-4-ethyl-4-methyl-2-oxazolin-5-one, 2-vinyl-4-dodecyl-4-methyl-2-oxazolin-5-one 2-vinyl-4,4-pentamethylene-2-oxazolin-5-one, 2-vinyl-4-methyl-4-phenyl-2-oxazolin-5-one, 2-isopropenyl-4benzyl-4-methyl-2-oxazolin-5-one, and 2-vinyl-4,4-dimethyl-1,3-oxazin-6-one.

7. The polymer according to claim 6 wherein said 2-alkenyl azlactone is selected from the group consisting of 2-vinyl-4,4-dimethyl-2-oxazolin-5-one, 2-isopropenyl-4,4-dimethyl-2-oxazolin-5-one, and 2-vinyl-4,4-dimethyl-1,3-oxazin-6-one.

8. The polymer according to claim 1 wherein said ethylenically unsaturated monomer from which M is derived is selected from the group consisting of vinyl aromatic monomers, $\alpha,\beta$-unsaturated carboxylic acids and their derivatives, vinyl esters of carboxylic acids, vinyl halides, vinyl ethers, olefins, N-vinyl compounds, vinyl ketones and vinyl aldehydes.

9. The polymer according to claim 1 wherein Y is derived from a compound having an active hydrogen atom and is selected from the group consisting of amines, alcohols, thiols, carboxylic acids, and carboxamides).

10. The polymer according to claim 1 having a molecular second order nonlinear hyperpolarizability, $\beta$, of at least $1 \times 10^{-29}$ esu, or a molecular third order nonlinear hyperpolarizability, $\lambda$, of at least $1 \times 10^{31\ 35}$ esu.

* * * * *

UNITED STATES PATENT AND TRADEMARK OFFICE
CERTIFICATE OF CORRECTION

PATENT NO. : 5,239,013
DATED : August 24, 1993
INVENTOR(S) : Cecil V. Francis et al.

It is certified that error appears in the above-identified patent and that said Letters Patent is hereby corrected as shown below:

On the Cover page , under [56] References Cited, Foreign Patent Documents, please add:

-- 0254178    01/1988    European Patent Office
   0180536    05/1986    European Patent Office --.

Col. 6, lines 19-27, kindly replace the formula IV shown with --

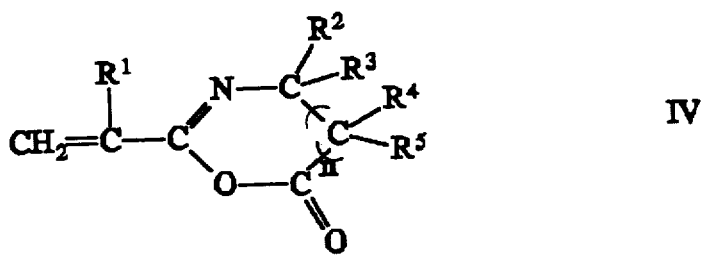

IV

--.

Col. 6, line 37, "2-vinyl-4,4-dimethyl 2-oxazolin-5-one" should read -- 2-vinyl-4,4-dimethyl-2-oxazolin-5-one --.

Col. 6, line 38, "2-vinyl-4,4 dimethylazlactone" should read -- 2-vinyl-4,4-dimethylazlactone --.

Col. 6, line 44, "2-vinyl-4,4 pentamethylene-2-oxazolin-5-one" should read -- 2-vinyl-4,4-pentamethylene-2-oxazolin-5-one --.

UNITED STATES PATENT AND TRADEMARK OFFICE
CERTIFICATE OF CORRECTION

PATENT NO. : 5,239,013
DATED : August 24, 1993
INVENTOR(S) : Cecil V. Francis et al.

It is certified that error appears in the above-identified patent and that said Letters Patent is hereby corrected as shown below:

Col. 6, line 46, "2isopropenyl-4-benzyl-4-methyl-2-oxazolin-5-one" should read -- 2-isopropenyl-4-benzyl-4-methyl-2-oxazolin-5-one --.

Col. 8, line 11, delete "are commercially".

Col. 10, lines 26-27, "2,2,-azobis-2-methylpropionitrile" should read -- 2,2'-azobis-2-methylpropionitrile --.

Col. 10, line 63, "4-amino-4,-nitrobiphenyl" should read -- 4-amino-4'-nitrobiphenyl --.

Col. 11, line 10, after "polymer" insert -- . --.

Col. 12, lines 40-44, in the formula, kindly replace the subscript "a" with a subscript -- n --.

Col. 13, lines 7-13, replace formula IV with the following: --

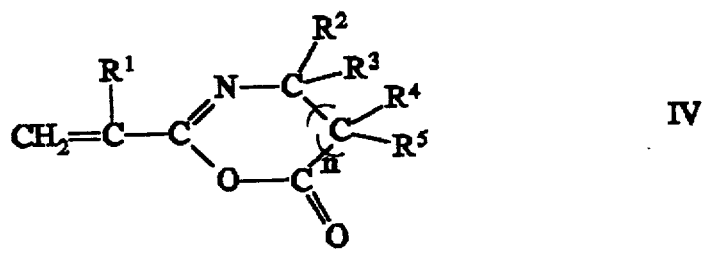

IV

UNITED STATES PATENT AND TRADEMARK OFFICE
CERTIFICATE OF CORRECTION

PATENT NO. : 5,239,013

DATED : August 24, 1993

INVENTOR(S) : Cecil V. Francis et al.

It is certified that error appears in the above-identified patent and that said Letters Patent is hereby corrected as shown below:

Col. 13, line 25 to Col. 14, line 1, "2-isopropenyl-4benzyl-4-methyl-2-oxazolin-5-one" should be -- 2-isopropenyl-4-benzyl-4-methyl-2-oxazolin-5-one --.

Signed and Sealed this

Twentieth Day of September, 1994

Attest:

BRUCE LEHMAN

Attesting Officer

Commissioner of Patents and Trademarks